(12) United States Patent
Kiyonaga et al.

(10) Patent No.: US 10,746,073 B2
(45) Date of Patent: Aug. 18, 2020

(54) DENITRATION CATALYST AND METHOD FOR PRODUCING THE SAME

(71) Applicants: The Chugoku Electric Power Co., Inc., Hiroshima (JP); Tokyo Metropolitan University, Tokyo (JP)

(72) Inventors: Eiji Kiyonaga, Hiroshima (JP); Kenji Hikino, Hiroshima (JP); Keiichiro Morita, Hiroshima (JP); Masatake Haruta, Tokyo (JP); Toru Murayama, Tokyo (JP); Makoto Mino, Tokyo (JP)

(73) Assignees: THE CHUGOKU ELECTRIC POWER CO., INC., Hiroshima (JP); TOKYO METROPOLITAN UNIVERSITY, Tokyo (JP)

( * ) Notice: Subject to any disclaimer, the term of this patent is extended or adjusted under 35 U.S.C. 154(b) by 0 days.

(21) Appl. No.: 15/764,077

(22) PCT Filed: Mar. 7, 2017

(86) PCT No.: PCT/JP2017/009045
§ 371 (c)(1),
(2) Date: Mar. 28, 2018

(87) PCT Pub. No.: WO2018/047378
PCT Pub. Date: Mar. 15, 2018

(65) Prior Publication Data
US 2019/0054448 A1  Feb. 21, 2019

(30) Foreign Application Priority Data
Sep. 12, 2016 (WO) .................. PCT/JP2016/076870

(51) Int. Cl.
*F01N 3/28* (2006.01)
*F01N 13/00* (2010.01)
(Continued)

(52) U.S. Cl.
CPC ....... *F01N 3/2842* (2013.01); *B01D 53/8628* (2013.01); *B01D 53/90* (2013.01);
(Continued)

(58) Field of Classification Search
CPC .... F01N 3/2842; F01N 13/009; F01N 3/0205; F01N 3/021; F01N 3/2066; F01N 3/208;
(Continued)

(56) References Cited

U.S. PATENT DOCUMENTS

| 4,466,947 A | 8/1984 | Imanari et al. |
| 4,833,113 A | 5/1989 | Imanari et al. |

(Continued)

FOREIGN PATENT DOCUMENTS

| CN | 101422728 A | 5/2009 |
| CN | 103157480 B | 2/2015 |

(Continued)

OTHER PUBLICATIONS

Office Action dated May 20, 2019 in in Patent Application No. IN201817011046, 6 pages.
(Continued)

*Primary Examiner* — James A Fiorito
(74) *Attorney, Agent, or Firm* — Muncy, Geissler, Olds & Lowe, P.C.

(57) ABSTRACT

There is provided a catalyst that exhibits a high denitration efficiency at a relatively low temperature and does not cause oxidation of $SO_2$ in a selective catalytic reduction reaction that uses ammonia as a reducing agent. A denitration catalyst is obtained by coating a substrate with a catalyst component. The catalyst component contains 43 wt % or more of vanadium pentoxide and has a BET specific surface area of 30 $m^2/g$ or more. The denitration catalyst is used for denitration at 200° C. or lower.

4 Claims, 14 Drawing Sheets

(51) Int. Cl.

| | | |
|---|---|---|
| *F01N 3/02* | (2006.01) | |
| *F01N 3/021* | (2006.01) | |
| *B01J 35/00* | (2006.01) | |
| *B01J 37/03* | (2006.01) | |
| *B01J 23/22* | (2006.01) | |
| *B01D 53/90* | (2006.01) | |
| *B01D 53/86* | (2006.01) | |
| *B01D 53/94* | (2006.01) | |
| *F01N 5/02* | (2006.01) | |
| *B01J 35/10* | (2006.01) | |
| *B01J 37/08* | (2006.01) | |
| *F01N 3/20* | (2006.01) | |
| *B01D 53/96* | (2006.01) | |
| *B01J 23/92* | (2006.01) | |
| *B01J 38/64* | (2006.01) | |
| *B01J 38/66* | (2006.01) | |
| *B01J 38/02* | (2006.01) | |
| *B01J 38/48* | (2006.01) | |
| *B01J 37/00* | (2006.01) | |
| *B01J 37/02* | (2006.01) | |

(52) U.S. Cl.
CPC ......... *B01D 53/9418* (2013.01); *B01D 53/96* (2013.01); *B01J 23/22* (2013.01); *B01J 23/92* (2013.01); *B01J 35/002* (2013.01); *B01J 35/1014* (2013.01); *B01J 37/0009* (2013.01); *B01J 37/0219* (2013.01); *B01J 37/036* (2013.01); *B01J 37/08* (2013.01); *B01J 37/082* (2013.01); *B01J 37/088* (2013.01); *B01J 38/02* (2013.01); *B01J 38/485* (2013.01); *B01J 38/64* (2013.01); *B01J 38/66* (2013.01); *F01N 3/021* (2013.01); *F01N 3/0205* (2013.01); *F01N 3/208* (2013.01); *F01N 3/2066* (2013.01); *F01N 3/28* (2013.01); *F01N 3/2803* (2013.01); *F01N 5/02* (2013.01); *F01N 13/009* (2014.06); *B01D 53/9436* (2013.01); *B01D 2251/206* (2013.01); *B01D 2255/20707* (2013.01); *B01D 2255/20723* (2013.01); *B01D 2255/9207* (2013.01); *B01D 2258/012* (2013.01); *B01D 2259/4566* (2013.01); *F01N 2330/00* (2013.01); *F01N 2330/06* (2013.01); *F01N 2330/08* (2013.01); *F01N 2330/42* (2013.01); *F01N 2370/02* (2013.01); *F01N 2510/068* (2013.01); *F01N 2570/14* (2013.01); *F01N 2590/02* (2013.01); *F01N 2610/02* (2013.01); *Y02T 10/16* (2013.01)

(58) Field of Classification Search
CPC . F01N 3/28; F01N 3/2803; F01N 5/02; B01D 53/8628; B01D 53/90; B01D 53/9418; B01D 53/96; B01J 23/22; B01J 23/92; B01J 35/002; B01J 35/1014; B01J 37/0009; B01J 37/0219; B01J 37/036; B01J 37/08; B01J 37/082; B01J 37/088; B01J 38/02; B01J 38/485; B01J 38/64; B01J 38/66
See application file for complete search history.

(56) References Cited

U.S. PATENT DOCUMENTS

| | | |
|---|---|---|
| 4,891,348 A | 1/1990 | Imanari et al. |
| 5,087,600 A | 2/1992 | Kato et al. |
| 5,696,049 A | 12/1997 | Ikeyama et al. |
| 5,753,582 A | 5/1998 | Garcin et al. |
| 5,827,489 A | 10/1998 | Garcin et al. |
| 6,027,697 A | 2/2000 | Kurihara et al. |
| 6,419,889 B1 | 7/2002 | Boxhoorn et al. |
| 7,256,155 B2 | 8/2007 | Nojima et al. |
| 8,661,993 B2 | 3/2014 | Kamiyama et al. |
| 9,192,920 B2 | 11/2015 | Nichi et al. |
| 9,623,402 B2 | 4/2017 | Masuda |
| 9,851,101 B2 | 12/2017 | Masuda et al. |
| 2004/0180783 A1 | 9/2004 | Nojima et al. |
| 2008/0152560 A1 | 6/2008 | Morita et al. |
| 2011/0150731 A1 | 6/2011 | Schermanz et al. |
| 2011/0311424 A1 | 12/2011 | Ellery |
| 2014/0080695 A1 | 3/2014 | Nochi et al. |
| 2014/0271383 A1 | 9/2014 | Marrino et al. |
| 2015/0224486 A1 | 8/2015 | Bauer et al. |
| 2015/0246823 A1 | 9/2015 | Yang et al. |
| 2016/0245511 A1 | 8/2016 | Masuda et al. |
| 2016/0288094 A1 | 10/2016 | Malmberg et al. |
| 2018/0085694 A1 | 3/2018 | Imada et al. |
| 2018/0272278 A1 | 9/2018 | Kiyonaga et al. |
| 2018/0272318 A1 | 9/2018 | Kiyonaga et al. |
| 2018/0280875 A1 | 10/2018 | Kiyonaga et al. |
| 2018/0280936 A1 | 10/2018 | Kiyonaga et al. |
| 2018/0280941 A1 | 10/2018 | Kiyonaga et al. |
| 2018/0280965 A1 | 10/2018 | Kiyonaga et al. |

FOREIGN PATENT DOCUMENTS

| | | |
|---|---|---|
| EP | 0547934 A1 | 6/1993 |
| EP | 0787521 A1 | 8/1997 |
| EP | 2189217 A1 | 5/2010 |
| EP | 2 610 454 A1 | 7/2013 |
| JP | S51100982 A | 9/1976 |
| JP | S51104489 A | 9/1976 |
| JP | 52-035786 A | 3/1977 |
| JP | 54-004873 A | 1/1979 |
| JP | S5466390 A | 5/1979 |
| JP | S56168835 A | 12/1981 |
| JP | 59-032712 A | 2/1984 |
| JP | S5949847 A | 3/1984 |
| JP | 59-217414 A | 12/1984 |
| JP | 04-225842 A | 8/1992 |
| JP | H06277512 A | 10/1994 |
| JP | 07-060134 A | 3/1995 |
| JP | 07-241476 A | 9/1995 |
| JP | H09103646 A | 4/1997 |
| JP | 11-253754 A | 9/1999 |
| JP | 2004275852 A | 10/2004 |
| JP | 2005-342710 A | 12/2005 |
| JP | 2011-190940 A | 9/2011 |
| JP | 2012-047096 A | 3/2012 |
| JP | 2012-524646 A | 10/2012 |
| JP | 2014-065031 A | 4/2014 |
| JP | 2014070625 A | 4/2014 |
| JP | 2014-213293 A | 11/2014 |
| JP | 2015-530921 A | 10/2015 |
| JP | 2015533766 A | 11/2015 |
| JP | 2016513582 A | 5/2016 |
| JP | 2017-018919 A | 1/2017 |
| JP | 2017-503632 A | 2/2017 |
| JP | 6093101 B1 | 3/2017 |
| KR | 20140036680 A | 8/2014 |
| WO | WO94/21373 | 9/1994 |
| WO | WO-2008-105469 A1 | 9/2008 |
| WO | WO2014/143465 A1 | 9/2014 |
| WO | WO-2015/110821 A1 | 7/2015 |
| WO | WO-2017042895 A1 | 3/2017 |

OTHER PUBLICATIONS

JPO. Notification of Reasons for Refusal issued to JP Patent Application No. 2018-533851, dated Oct. 16, 2018. 3 pages.
JPO. Notification of Reasons for Refusal issued to JP Patent Application No. 2018-533706, dated Oct. 16, 2018. 3 pages.
JPO. Notification of Reasons for Refusal issued to JP Patent Application No. 2018-533852, dated Oct. 16, 2018. 3 pages.
JPO. Notification of Reasons for Refusal issued to JP Patent Application No. 2018-533707, dated Oct. 16, 2018. 4 pages.

(56) References Cited

OTHER PUBLICATIONS

Japanese Notification for Refusal dated Nov. 15, 2016 cited in corresponding application JP2016-560930, 3 pages.
Makoto Mino et al., "NH3 Catalytic Selective Reduction At Low Temperatures of NO Using Vanadium Oxide", Dai 118 Kai CatSJ Meeting Toronkai A Yokoshu, Sep. 14, 2016, p. 435-436.
Shigeaki Kasaoka, Eiji Sasaoka, "Research of High Active Vanadium Oxides Catalysts for Low Temperature-Reduction of Nitrogen Oxides with Ammonia", Environmental Conservation Engineering, 1979, vol. 8, No. 7, pp. 676 to 684.
United States Patent and Trademark Office, Office Action issued in the U.S. Appl. No. 15/764,222, dated Nov. 13, 2018, 9 pages.
United States Patent and Trademark Office, Office Action issued in the U.S. Appl. No. 15/764,234, dated Jan. 7, 2019, 7 pages.
Office Action dated Oct. 30, 2019 in U.S. Appl. No. 15/764,245.
Office Action dated Sep. 27, 2019 in India Application No. 201817011508.
U.S. Appl. No. 15/764,038, filed Mar. 28, 2018.
U.S. Appl. No. 15/764,233, filed Mar. 28, 2018.
U.S. Appl. No. 15/764,234, filed Mar. 28, 2018.
U.S. Appl. No. 15/764,200, filed Mar. 28, 2018.
U.S. Appl. No. 15/764,209, filed Mar. 28, 2018.
U.S. Appl. No. 15/764,245, filed Mar. 28, 2018.
U.S. Appl. No. 15/764,222, filed Mar. 28, 2018.
U.S. Office Action in U.S. Appl. No. 15/764,038 dated Apr. 30, 2020; pp. 1-8.
Extended European Search Report issued in EP Patent Application No. EP16915773.2, dated Mar. 4, 2020, 8 pages.
Extended European Search Report issued in EP Patent Application No. EP17848324.4, dated Mar. 5, 2020, 7 pages.
Extended European Search Report issued in EP Patent Application No. EP17848325.1, dated Mar. 4, 2020, 9 pages.
Extended European Search Report issued in EP Patent Application No. EP17848329.3, dated Mar. 5, 2020, 7 pages.
Extended European Search Report issued in EP Patent Application No. EP17848330.1, dated Mar. 5, 2020, 7 pages.

DENITRATION CATALYST AND METHOD FOR PRODUCING THE SAME

TECHNICAL FIELD

The present invention relates to a denitration catalyst and a method for producing the denitration catalyst. More specifically, the present invention relates to a denitration catalyst used when exhaust gas generated through fuel combustion is cleaned up and a method for producing the denitration catalyst.

BACKGROUND ART

One of pollutants emitted to the air through fuel combustion is nitrogen oxide (NO, $NO_2$, $NO_3$, $N_2O$, $N_2O_3$, $N_2O_4$, or $N_2O_5$). Nitrogen oxide causes, for example, acid rain, ozone depletion, and photochemical smog and seriously affects the environment and the human body, and therefore the treatment for nitrogen oxide has been an important issue.

A known technique of removing the nitrogen oxide is a selective catalytic reduction reaction ($NH_3$-SCR) that uses ammonia ($NH_3$) as a reducing agent. As described in Patent Document 1, a catalyst in which vanadium oxide is supported on titanium oxide serving as a carrier is widely used as a catalyst for the selective catalytic reduction reaction. Titanium oxide is the best carrier because titanium oxide has a low activity against sulfur oxide and has high stability.
Patent Document 1: Japanese Unexamined Patent Application, Publication No. 2004-275852

DISCLOSURE OF THE INVENTION

Problems to be Solved by the Invention

On the other hand, vanadium oxide plays a key role in the $NH_3$-SCR, but vanadium oxide cannot be supported in an amount of about 1 wt % or more because vanadium oxide oxidizes $SO_2$ into $SO_3$. Therefore, vanadium oxide is typically used in an amount of 1 wt % or less relative to its carrier. Furthermore, in the current $NH_3$-SCR, a catalyst in which vanadium oxide (and tungsten oxide in some cases) is supported on a titanium oxide carrier hardly reacts at low temperature and thus needs to be used at a high temperature of 350° C. to 400° C.

In order to increase the degree of freedom in the design of apparatuses and facilities with which the $NH_3$-SCR is performed and increase the efficiency, the development of a catalyst having a high nitrogen oxide reduction activity even at low temperature has been demanded.

In view of the foregoing, it is an object of the present invention to provide a catalyst that exhibits a high denitration efficiency at low temperature and does not cause oxidation of $SO_2$ in a selective catalytic reduction reaction that uses ammonia as a reducing agent.

Means for Solving the Problems

The present invention relates to a denitration catalyst obtained by coating a substrate with a catalyst component, wherein the catalyst component contains 43 wt % or more of vanadium pentoxide and has a BET specific surface area of 30 m²/g or more, and the denitration catalyst is used for denitration at 200° C. or lower.

In the catalyst component, an amount of $NH_3$ desorbed by $NH_3$-TPD (TPD: temperature programed desorption) is preferably 10.0 μmol/g or more.

The present invention relates to a method for producing the denitration catalyst, the method including a step of impregnating the substrate with a chelate compound solution in which vanadium pentoxide is dissolved and then performing firing.

The present invention relates to a method for producing the denitration catalyst, the method including a step of spraying a chelate compound solution in which vanadium pentoxide is dissolved onto the substrate and then performing firing.

Effects of the Invention

The denitration catalyst according to the present invention exhibits a high denitration efficiency particularly at 200° C. or lower, which allows detoxification of NO into $N_2$. The selective catalytic reduction reaction that uses the denitration catalyst according to the present invention can be performed at 200° C. or lower, and therefore oxidation of $SO_2$ does not occur.

PREFERRED MODE FOR CARRYING OUT THE INVENTION

Figure 1:
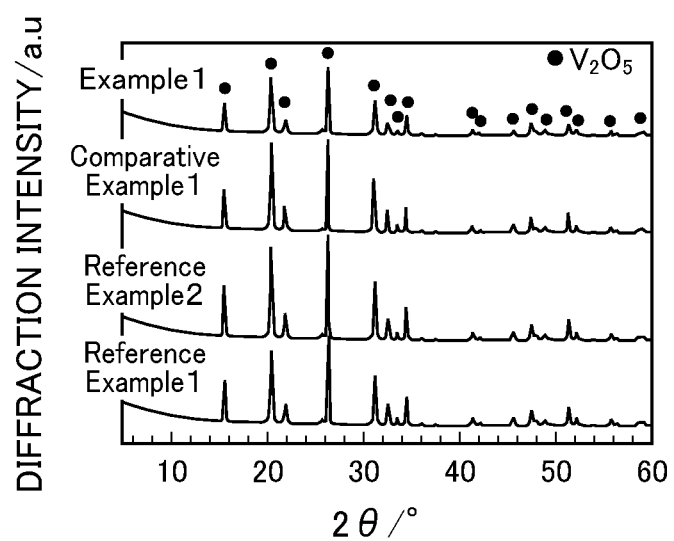
FIG. 1 illustrates the powder X-ray diffraction results of vanadium pentoxide catalysts produced in Example 1, Reference Examples 1 and 2, and Comparative Example 1.

Hereafter, embodiments of the present invention will be described.

A denitration catalyst of the present invention is a denitration catalyst obtained by coating a substrate with a catalyst component, and the catalyst component contains 43 wt % or more of vanadium pentoxide and has a BET specific surface area of 30 m$^2$/g or more. The denitration catalyst is used for denitration at 200° C. or lower. Such a denitration catalyst produces a higher denitration effect even in a low-temperature environment than known denitration catalysts such as a vanadium/titanium catalyst.

Specifically, when a denitration catalyst containing 3.3 wt % or more of vanadium oxide in terms of vanadium pentoxide is used in a selective catalytic reduction reaction ($NH_3$-SCR) that uses ammonia as a reducing agent, the NO conversion ratio is approximately 35% or more at a reaction temperature of 120° C. and approximately 60% or more at a reaction temperature of 150° C. Even at a reaction temperature of 100° C., the NO conversion ratio exceeds 20%. In contrast, if the denitration catalyst contains only less than 3.3 wt % of vanadium oxide in terms of vanadium pentoxide, the NO conversion ratio is less than 20% at a reaction temperature of 120° C. and even at a reaction temperature of 150° C.

As described above, the catalyst component used for coating in the denitration catalyst according to the present invention contains 43 wt % or more of vanadium oxide in terms of vanadium pentoxide. The catalyst component may contain titanium oxide in addition to the vanadium oxide. Furthermore, a noble metal, a base metal, and a main group metal may be contained. Preferably, for example, tungsten oxide, chromium oxide, and molybdenum oxide can also be contained.

It has been described that the catalyst component preferably contains 43 wt % or more of vanadium pentoxide. Preferably, the catalyst component may contain 80 wt % or more of vanadium oxide in terms of vanadium pentoxide. More preferably, the content of vanadium oxide in the catalyst component may be 100%.

The above-described vanadium oxide includes vanadium (II) oxide (VO), vanadium(III) trioxide ($V_2O_3$), vanadium (IV) dioxide ($V_2O_4$), and vanadium(V) pentoxide ($V_2O_5$), and the V element in vanadium pentoxide ($V_2O_5$) may have a pentavalent, tetravalent, trivalent, or divalent form in the denitration reaction.

Regarding the BET specific surface area of the catalyst component, for example, in the $NH_3$-SCR that is performed at a reaction temperature of 120° C. using a denitration catalyst containing vanadium pentoxide and having a BET specific surface area of 13.5 m$^2$g$^{-1}$, the NO conversion ratio exceeds 20%. Even in the $NH_3$-SCR that is performed at a reaction temperature of 120° C. using a denitration catalyst containing vanadium pentoxide and having a BET specific surface area of 16.6 m$^2$g$^{-1}$, the NO conversion ratio exceeds 20%. In contrast, in the $NH_3$-SCR that is performed at a reaction temperature of 120° C. using, for example, a denitration catalyst having a BET specific surface area of 4.68 m$^2$/g, which is a denitration catalyst having a BET specific surface area of less than 10 m$^2$/g, the NO conversion ratio falls below 20%.

The BET specific surface area of the catalyst component is 30 m$^2$/g or more. The BET specific surface area of the catalyst component may be preferably 40 m$^2$/g or more. More preferably, the BET specific surface area of the catalyst component may be 50 m$^2$/g or more. More preferably, the BET specific surface area of the catalyst component may be 60 m$^2$/g or more.

The BET specific surface area of the catalyst component is preferably measured in conformity with the conditions specified in JIS Z8830:2013. Specifically, the BET specific surface area can be measured by a method described in Examples below.

The denitration catalyst of the present invention is used for denitration at 200° C. or lower. Preferably, the denitration catalyst is used for denitration at 160° C. or higher and 200° C. or lower. Thus, oxidation of $SO_2$ into $SO_3$ does not occur during the $NH_3$-SCR reaction.

Regarding the amount of $NH_3$ desorbed by $NH_3$-TPD (TPD: temperature programed desorption), when the amount of $NH_3$ desorbed exceeds 10.0 µmol/g, the NO conversion ratio of the denitration catalyst in the $NH_3$-SCR at a reaction temperature of 120° C. is 20% or more. In contrast, when the amount of $NH_3$ desorbed falls below 10.0 µmol/g, the NO conversion ratio of the denitration catalyst in the $NH_3$-SCR at a reaction temperature of 120° C. falls below 20%.

In the catalyst component of the present invention, the amount of $NH_3$ desorbed by $NH_3$-TPD (TPD: temperature programed desorption) is 10.0 µmol/g or more. Preferably, the amount of $NH_3$ desorbed by $NH_3$-TPD may be 20.0 µmol/g or more. More preferably, the amount of $NH_3$ desorbed by $NH_3$-TPD may be 50.0 µmol/g or more. More preferably, the amount of $NH_3$ desorbed by $NH_3$-TPD may be 70.0 µmol/g or more.

The catalyst component of the denitration catalyst that contains 43 wt % or more of vanadium pentoxide and has a BET specific surface area of 30 m$^2$/g or more can be produced by any of a thermal decomposition process, a sol-gel process, and an impregnation process. Hereafter, a method for producing the denitration catalyst containing 3.3 wt % or more of vanadium pentoxide and having a BET specific surface area of 10 m$^2$/g or more by a thermal decomposition process, a sol-gel process, or an impregnation process will be described.

The thermal decomposition process includes a step of thermally decomposing a vanadate. Examples of the vanadate that may be used include ammonium vanadate, magnesium vanadate, strontium vanadate, barium vanadate, zinc vanadate, tin vanadate, and lithium vanadate.

In the thermal decomposition process, the vanadate is preferably thermally decomposed at 300° C. to 400° C.

The sol-gel process includes a step of dissolving a vanadate in a chelate compound, performing drying, and performing firing. Examples of the chelate compound that may be used include compounds having a plurality of carboxy groups, such as oxalic acid and citric acid; compounds having a plurality of amino groups, such as acetylacetonate and ethylenediamine; and compounds having a plurality of hydroxy groups, such as ethylene glycol.

The sol-gel process preferably includes a step of dissolving a vanadate in a chelate compound such that the molar ratio of vanadium and the chelate compound is, for example, 1:1 to 1:5, though this is dependent on the chelate compound. Preferably, the molar ratio of the vanadate and the chelate compound may be 1:2 to 1:4.

The impregnation process includes a step of dissolving a vanadate in a chelate compound, adding a carrier, performing drying, and then performing firing. Examples of the carrier that may be used include titanium oxide, aluminum oxide, and silica. As above, examples of the chelate compound that may be used include compounds having a plurality of carboxy groups, such as oxalic acid and citric acid; compounds having a plurality of amino groups, such as acetylacetonate and ethylenediamine; and compounds having a plurality of hydroxy groups, such as ethylene glycol.

In the impregnation process, xwt % $V_2O_5/TiO_2$ (x≥43) may be produced as a denitration catalyst according to an embodiment of the present invention by, for example, dissolving ammonium vanadate in an oxalic acid solution, adding titanium oxide ($TiO_2$) serving as a carrier, performing drying, and then performing firing.

The thus-produced denitration catalyst normally contains 3.3 wt % or more of vanadium pentoxide and has a specific surface area of 10 $m^2/g$ or more.

The denitration catalyst is basically in the form of powder. However, for example, as disclosed in Japanese Unexamined Patent Application Publication No. 2005-199108, a honeycomb-type catalyst obtained by coating a honeycomb-shaped substrate with a catalyst component is sometimes used in a flue gas denitration device disposed in a thermal power plant. In the present invention, the substrate can also be coated with the above denitration catalyst as a catalyst component.

Specifically, a catalyst obtained by coating a substrate with vanadium pentoxide can be produced by immersing a substrate in a chelate compound solution in which vanadium pentoxide is dissolved, performing drying, and then performing firing. Alternatively, a catalyst obtained by coating a substrate with vanadium pentoxide can be produced by spraying a chelate compound solution in which vanadium pentoxide is dissolved onto a substrate, performing drying, and then performing firing. As above, examples of the chelate compound that may be used include compounds having a plurality of carboxy groups, such as oxalic acid and citric acid; compounds having a plurality of amino groups, such as acetylacetonate and ethylenediamine; and compounds having a plurality of hydroxy groups, such as ethylene glycol.

The molar ratio of the vanadium pentoxide and the chelate compound is preferably 1:1 to 1:5. Preferably, the molar ratio of the vanadium pentoxide and the chelate compound may be 1:2 to 1:4. The firing temperature is preferably, for example, about 300° C.

The above substrate may be any substrate as long as, for example, the substrate does not deform at a temperature of 200° C. or higher. The substrate may be formed of, for example, ceramic, pottery, or a metal such as titanium. Alternatively, a new catalyst or a used catalyst may be further coated with the catalyst component of the present invention. The substrate may have any shape such as a plate-like shape, a pellet shape, a fluid shape, a columnar shape, a star shape, a ring shape, an extruded shape, a spherical shape, a flake shape, a pastille shape, a ribbed extruded shape, or a ribbed ring shape.

The denitration catalyst according to the above embodiment produces the following effects.

(1) As described above, the denitration catalyst according to the above embodiment is a denitration catalyst obtained by coating a substrate with a catalyst component, and the catalyst component contains 43 wt % or more of vanadium pentoxide and has a BET specific surface area of 30 $m^2/g$ or more. The denitration catalyst is used for denitration at 200° C. or lower. By using this denitration catalyst, a high denitration effect can be produced even in a selective catalytic reduction reaction at 200° C. or lower. Furthermore, a high denitration effect is produced in the selective catalytic reduction reaction that uses the denitration catalyst according to the above embodiment without oxidizing $SO_2$.

(2) As described above, in the catalyst component of the denitration catalyst according to the above embodiment, an amount of $NH_3$ desorbed by $NH_3$-TPD (TPD: temperature programed desorption) is preferably 10.0 µmol/g or more. When this denitration catalyst is used in the $NH_3$-SCR at a reaction temperature of 120° C., the NO conversion ratio exceeds 20%.

(3) As described above, the method for producing a denitration catalyst according to the above embodiment preferably includes a step of impregnating the substrate with a chelate compound solution in which vanadium pentoxide is dissolved and then performing firing. This increases the specific surface area of the denitration catalyst according to the above embodiment, which improves a denitration effect in the selective catalytic reduction reaction that uses the denitration catalyst according to the above embodiment.

(4) As described above, the method for producing a denitration catalyst according to the above embodiment preferably includes a step of spraying a chelate compound solution in which vanadium pentoxide is dissolved onto the substrate and then performing firing. This increases the specific surface area of the denitration catalyst according to the above embodiment, which improves a denitration effect in the selective catalytic reduction reaction that uses the denitration catalyst according to the above embodiment.

The present invention is not limited to the above embodiment, and any of modifications, improvements, and the like are included in the present invention as long as the object of the present invention is achieved.

EXAMPLES

Hereafter, Examples of the catalyst component of the present invention will be specifically described together with Reference Examples and Comparative Examples. The present invention is not limited by Examples.

1. Relationship Between Vanadium Oxide Content and Specific Surface Area and $NH_3$-SCR Activity 1.1 EXAMPLES AND COMPARATIVE EXAMPLES Reference Example 1

Ammonium vanadate ($NH_4VO_3$) was thermally decomposed in the air at 300° C. for 4 hours to obtain vanadium pentoxide ($V_2O_5$). The obtained vanadium pentoxide was used as a denitration catalyst in Reference Example 1. The sample name of the denitration catalyst in Reference Example 1 was "$V_2O_5$_300".

Reference Example 2

Ammonium vanadate was thermally decomposed in the air at 400° C. for 4 hours to obtain vanadium pentoxide. The obtained vanadium pentoxide was used as a denitration catalyst in Reference Example 2. The sample name of the denitration catalyst in Reference Example 2 was "$V_2O_5\_400$".

Comparative Example 1

Ammonium vanadate was thermally decomposed in the air at 500° C. for 4 hours to obtain vanadium pentoxide. The obtained vanadium pentoxide was used as a denitration catalyst in Comparative Example 1. The sample name of the denitration catalyst in Comparative Example 1 was "$V_2O_5\_500$".

Example 1

Ammonium vanadate was dissolved in an oxalic acid solution (molar ratio of vanadium:oxalic acid=1:3). After ammonium vanadate was completely dissolved, water in the solution was evaporated on a hot stirrer, and drying was performed in a dryer at 120° C. for one night. Then, the dried powder was fired in the air at 300° C. for 4 hours. The vanadium pentoxide after firing was used as a denitration catalyst in Example 1. The sample name of the denitration catalyst in Example 1 obtained by this sol-gel process was "$V_2O_5\_SG\_300$". Denitration catalysts obtained at different molar ratios of vanadium and oxalic acid when ammonium vanadate is dissolved in an oxalic acid solution will be described later.

Comparative Example 2

Ammonium vanadate was added to an oxalic acid solution and stirred for 10 minutes, and titanium oxide serving as a carrier was gradually added. Then, water in the solution was evaporated on a hot stirrer and drying was performed in a dryer at 120° C. for one night. Subsequently, the dried powder was fired in the air at 300° C. for 4 hours. As a result, the denitration catalyst after firing that contained 0.3 wt % of vanadium pentoxide was used as a denitration catalyst in Comparative Example 2. The sample name of the denitration catalyst in Comparative Example 2 was "0.3 wt % $V_2O_5/TiO_2$".

Comparative Example 3

The denitration catalyst after firing that was obtained by the same method as in Comparative Example 2 and contained 0.9 wt % of vanadium pentoxide was used as a denitration catalyst in Comparative Example 3. The sample name of the denitration catalyst in Comparative Example 3 was "0.9 wt % $V_2O_5/TiO_2$".

Reference Example 3

The denitration catalyst after firing that was obtained by the same method as in Comparative Example 2 and contained 3.3 wt % of vanadium pentoxide was used as a denitration catalyst in Reference Example 3. The sample name of the denitration catalyst in Reference Example 3 was "3.3 wt % $V_2O_5/TiO_2$".

Reference Example 4

The denitration catalyst after firing that was obtained by the same method as in Comparative Example 2 and contained 9 wt % of vanadium pentoxide was used as a denitration catalyst in Reference Example 4. The sample name of the denitration catalyst in Reference Example 4 was "9 wt % $V_2O_5/TiO_2$".

Reference Example 5

The denitration catalyst after firing that was obtained by the same method as in Comparative Example 2 and contained 20 wt % of vanadium pentoxide was used as a denitration catalyst in Reference Example 5. The sample name of the denitration catalyst in Reference Example 5 was "20 wt % $V_2O_5/TiO_2$".

Reference Example 6

The denitration catalyst after firing that was obtained by the same method as in Comparative Example 2 and contained 33 wt % of vanadium pentoxide was used as a denitration catalyst in Reference Example 6. The sample name of the denitration catalyst in Reference Example 6 was "33 wt % $V_2O_5/TiO_2$".

Example 2

The denitration catalyst after firing that was obtained by the same method as in Comparative Example 2 and contained 43 wt % of vanadium pentoxide was used as a denitration catalyst in Example 2. The sample name of the denitration catalyst in Example 2 was "43 wt % $V_2O_5/TiO_2$".

Example 3

The denitration catalyst after firing that was obtained by the same method as in Comparative Example 2 and contained 80 wt % of vanadium pentoxide was used as a denitration catalyst in Example 3. The sample name of the denitration catalyst in Example 3 was "80 wt % $V_2O_5/TiO_2$".

Comparative Example 4

An existing catalyst was used in Comparative Example 4. The existing catalyst is a catalyst in which, for example, tungsten oxide ($WO_3$) (content: 10.72 wt %) and silica ($SiO_2$) (content: 6.25 wt %) are supported on titanium oxide ($TiO_2$) (content: 79.67 wt %) and which contains about 0.5% of vanadium.

Figure 2:
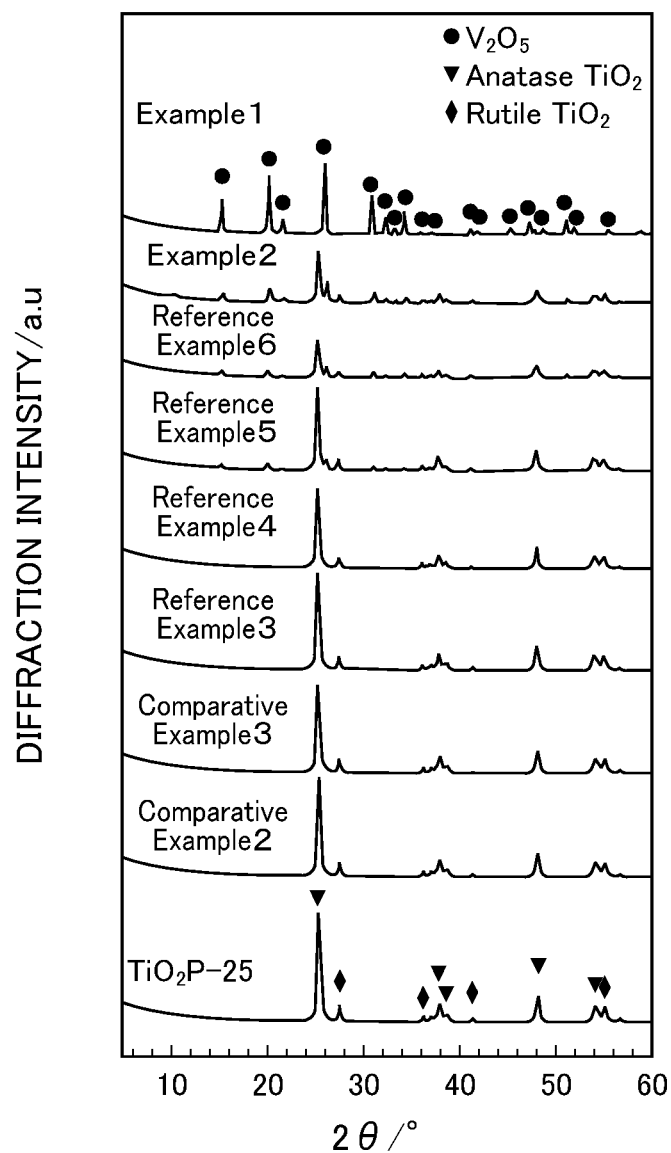
FIG. 2 illustrates the powder X-ray diffraction results of vanadium pentoxide catalysts produced in Examples 1 and 2, Reference Examples 3 to 6, and Comparative Examples 2 and 3.

1.2 Evaluation 1.2.1 Powder X-Ray Diffraction
(Diffraction Method)
Powder X-ray diffraction analysis was performed with a Rigaku smart lab using Cu-Ka.
(Diffraction Result)
FIG. 1 illustrates powder XRD patterns of Example 1 ($V_2O_5\_SG\_300$), Reference Example 1 ($V_2O_5\_300$), Reference Example 2 ($V_2O_5\_400$), and Comparative Example 1 ($V_2O_3\_500$). FIG. 2 illustrates powder XRD patterns of Example 1 ($V_2O_5\_SG\_300$) and Example 2, Reference Examples 3 to 6, and Comparative Examples 2 and 3 (xwt % $V_2O_5/TiO_2$). In the powder XRD patterns of Example 1 ($V_2O_5\_SG\_300$), Reference Example 1 ($V_2O_5\_300$), Reference Example 2 ($V_2O_5\_400$), and Comparative Example 1 ($V_2O_5\_500$), only peaks for $V_2O_5$ were observed regardless of the thermal decomposition temperature and the production method. In the powder XRD patterns of Example 2, Reference Examples 3 to 6, and Comparative Examples 2 and 3 (xwt % $V_2O_5/TiO_2$), peaks for $V_2O_5$ were not observed at 9 wt % or less and thus $V_2O_5$ is believed to be highly dispersed in $TiO_2$. When the amount of $V_2O_5$ supported was increased to 20 wt %, peaks for $V_2O_5$ were observed at 22.2° and 27.4°, and the $V_2O_5$ peak intensity increased as the amount of $V_2O_5$ supported was increased. On the other hand, the $TiO_2$ peak intensity tended to decrease.

1.2.2 Measurement of BET Specific Surface Area
(Measurement Method)

The BET specific surface area was measured with a MicrotracBEL BELSORP-max. Pretreatment was performed in an Ar atmosphere at 200° C. for 2 hours, and then measurement was performed at 196° C.

(Measurement Result)

TABLE 1

BET specific surface area of vanadium pentoxide catalyst

| Sample | | BET specific surface area/$m^2g^{-1}$ |
|---|---|---|
| Reference Example 1 | ($V_2O_5$_300) | 16.6 |
| Reference Example 2 | ($V_2O_5$_400) | 13.5 |
| Comparative Example 1 | ($V_2O_5$_500) | 4.68 |
| Example 1 | ($V_2O_5$_SG_300) | 62.9 |
| Comparative Example 2 | (0.3 wt % $V_2O_5/TiO_2$) | 62.8 |
| Comparative Example 3 | (0.9 wt % $V_2O_5/TiO_2$) | 59 |
| Reference Example 3 | (3.3 wt % $V_2O_5/TiO_2$) | 55.4 |
| Reference Example 4 | (9 wt % $V_2O_5/TiO_2$) | 54.6 |
| Reference Example 5 | (20 wt % $V_2O_5/TiO_2$) | 48.3 |
| Reference Example 6 | (33 wt % $V_2O_5/TiO_2$) | 41.2 |
| Example 2 | (43 wt % $V_2O_5/TiO_2$) | 49.4 |
| Example 3 | (80 wt % $V_2O_5/TiO_2$) | 34 |
| Comparative Example 4 | (Existing catalyst) | 61.8 |

Table 1 shows BET specific surface areas of Reference Example 1 ($V_2O_5$_300), Reference Example 2 ($V_2O_5$_400), Comparative Example 1 ($V_2O_5$_500), Example 1 ($V_2O_5$_SG_300), Comparative Examples 2 and 3, Reference Examples 3 to 6, and Examples 2 and 3 (xwt % $V_2O_5/TiO_2$ catalyst), and Comparative Example 4 (existing catalyst). In the vanadium pentoxide catalysts obtained by thermally decomposing ammonium vanadate, the BET specific surface area decreased with increasing the thermal decomposition temperature. That is, the vanadium pentoxide in Reference Example 1 ($V_2O_5$_300) in which the thermal decomposition was performed at 300° C. had a maximum BET specific surface area of 16.6 $m^2g^{-1}$. The vanadium pentoxide obtained at 300° C. through a sol-gel process had a larger BET specific surface area of 62.9 $m^2g^{-1}$. In Reference Examples 3 to 6, Examples 2 and 3, and Comparative Examples 2 and 3 (xwt % $V_2O_5/TiO_2$), as the amount of vanadium pentoxide supported was increased, pores in $TiO_2$ were filled and the BET specific surface area decreased.

1.2.3 Measurement of Catalytic Activity
(Measurement Method)

An $NH_3$-SCR reaction was performed using a fixed-bed flow reactor under the conditions listed in Table 2 below. Among gases that had passed through the catalytic layer, NO, $NH_3$, $NO_2$, and $N_2O$ were analyzed with a Jasco FT-IR-4700.

TABLE 2

$NH_3$-SCR measurement conditions

| Amount of catalyst | 0.375 mg |
|---|---|
| Gas flow rate | 250 mLmin$^{-1}$ |
| | (NO: 250 ppm, $NH_3$: 250 ppm, $O_2$: 4 vol %) |
| | (2000 ppm NO/Ar 31.3 mL min$^{-1}$) |

TABLE 2-continued $NH_3$-SCR measurement conditions

| | (2000 ppm $NH_3$/Ar 31.3 mL min$^{-1}$) |
|---|---|
| | ($O_2$ 14 mL min$^{-1}$) |
| | (Ar 177.4 mL min$^{-1}$) |
| Space velocity | 40,000 mLh$^{-1}$g$_{cat}^{-1}$ |

Furthermore, the NO conversion ratio and the $N_2$ selectivity were calculated from formulae below. Herein, $NO_{in}$ represents a NO concentration at an inlet of a reaction tube, $NO_{out}$ represents a NO concentration at an outlet of the reaction tube, $N_{2out}$ represents a $N_2$ concentration at the outlet of the reaction tube, $NH_{3in}$ represents a $NH_3$ concentration at the inlet of the reaction tube, and $NH_{3out}$ represents a $NH_3$ concentration at the outlet of the reaction tube.

$$\text{NO CONVERSION RATIO} = \frac{NO_{in} - NO_{out}}{NO_{in}} \times 100 \quad \text{[Formula 1]}$$

$$N_2 \text{ SELECTIVITY } (\%) = \frac{2 * N_{2out}}{(NO_{in} + NH_{3in}) - (NO_{out} + NH_{3out})} \times 100 \quad \text{[Formula 2]}$$

$$(2 * N_{2out} = (NO_{in} + NH_{3in}) - (NO_{out} + NH_{3out} + NO_{2out} + 2 * N_2O_{out}))$$

(Measurement Result)

Figure 3:
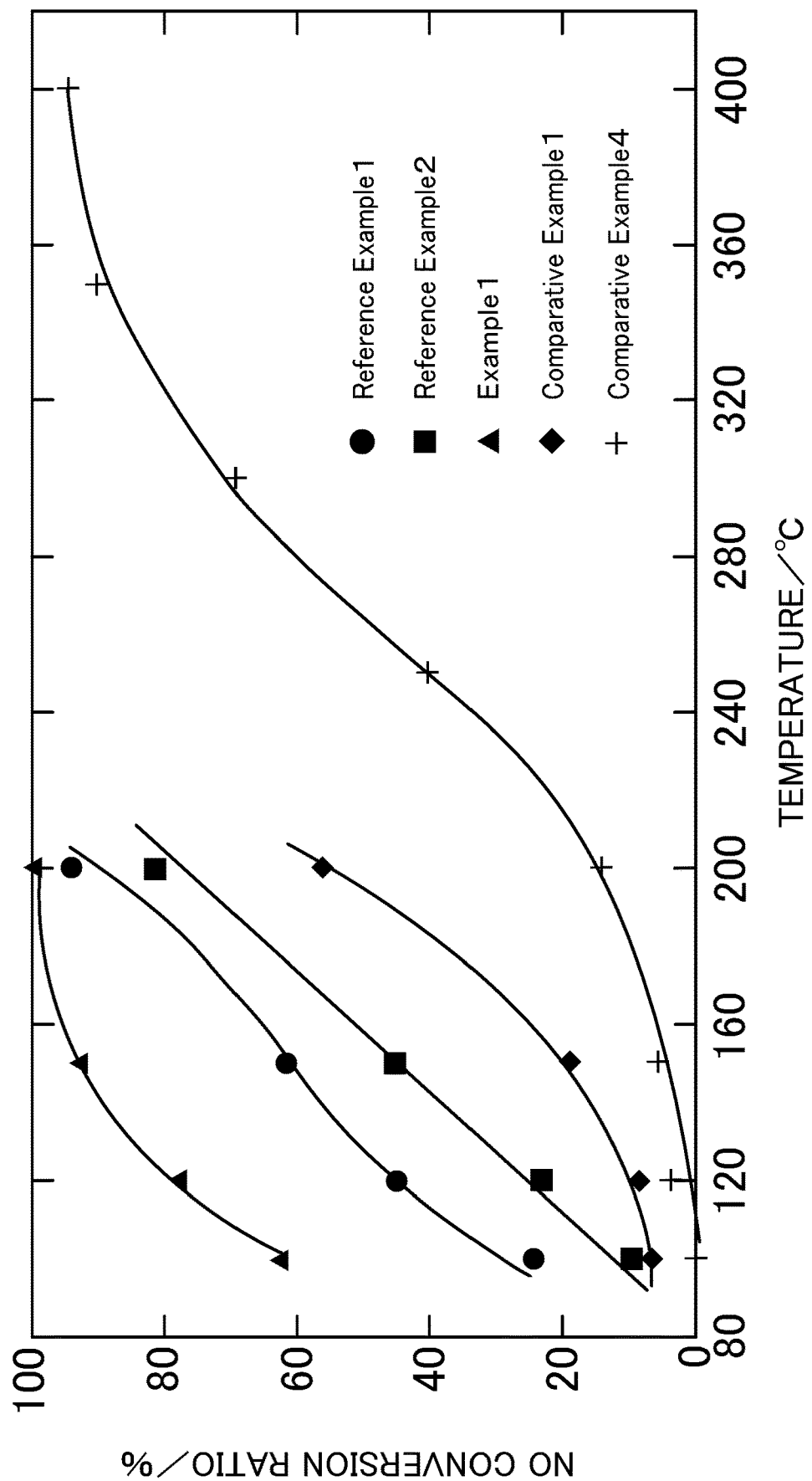
FIG. 3 illustrates the $NH_3$-SCR activity of vanadium pentoxide catalysts produced in Example 1, Reference Examples 1 and 2, and Comparative Examples 1 and 4.

FIG. 3 illustrates the $NH_3$-SCR activity of the vanadium pentoxide catalysts. In the case of the catalysts obtained by thermally decomposing ammonium vanadate, the NO conversion ratio increased as the thermal decomposition temperature was decreased. The highest activity was exhibited in Reference Example 1 ($V_2O_5$_300° C.) in which the catalyst was obtained at a thermal decomposition temperature of 300° C. At a reaction temperature of 200° C., a NO conversion ratio of 80% or more was achieved when any of the catalysts in Reference Example 1 ($V_2O_5$_300° C.), Reference Example 2 ($V_2O_5$_400° C.), and Example 1 ($V_2O_5$_SG_300° C.) was used. Furthermore, the NO conversion ratio was higher in any of Examples than in Comparative Example 1 and Comparative Example 4.

The specific surface area of the vanadium pentoxide increases as the thermal decomposition temperature is decreased. Therefore, it is believed that the low-temperature $NH_3$-SCR activity that uses a bulk vanadium pentoxide catalyst is attributable to the BET specific surface area. Hence, as described above, the vanadium pentoxide was produced through a sol-gel process that uses oxalic acid in order to increase the BET specific surface area in Example 1. The BET specific surface area of the vanadium pentoxide produced through this process is 62.9 $m^2g^{-1}$ as shown in Table 1, which is about four times larger than the BET specific surface areas of the vanadium pentoxides produced through a thermal decomposition process. The NO conversion ratio in Example 1 ($V_2O_5$_SG_300° C.) was increased by 80% to 200% at 100° C. to 150° C. compared with the vanadium pentoxides produced through a thermal decomposition process.

Figure 4:
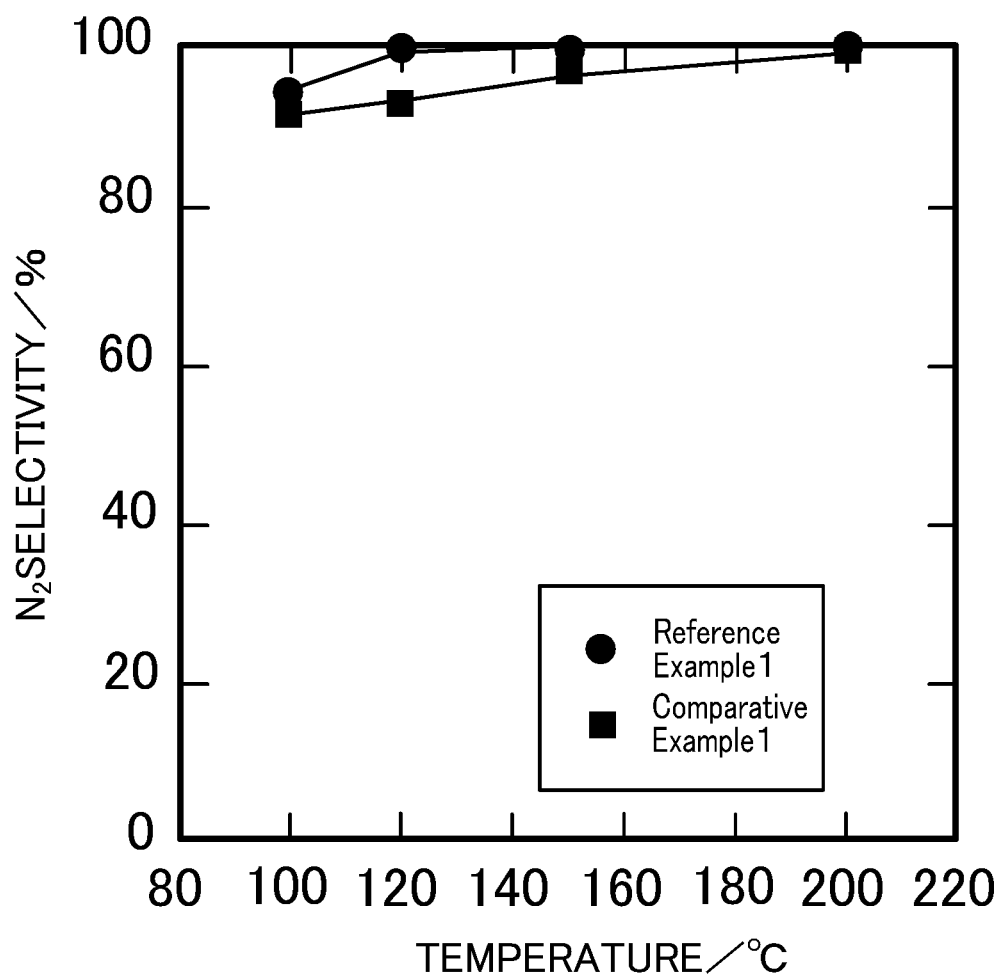
FIG. 4 illustrates the relationship between the reaction temperature and the $N_2$ selectivity in a selective catalytic reduction reaction that uses vanadium pentoxide catalysts produced in Reference Example 1 and Comparative Example 1.

The $N_2$ selectivity was almost 100% at any temperature. FIG. 4 illustrates, as examples, the $N_2$ selectivities in Reference Example 1 ($V_2O_5$_300° C.) and Comparative Example 1 ($V_2O_5$_500° C.).

(Space Velocity Dependency)

Figure 5:
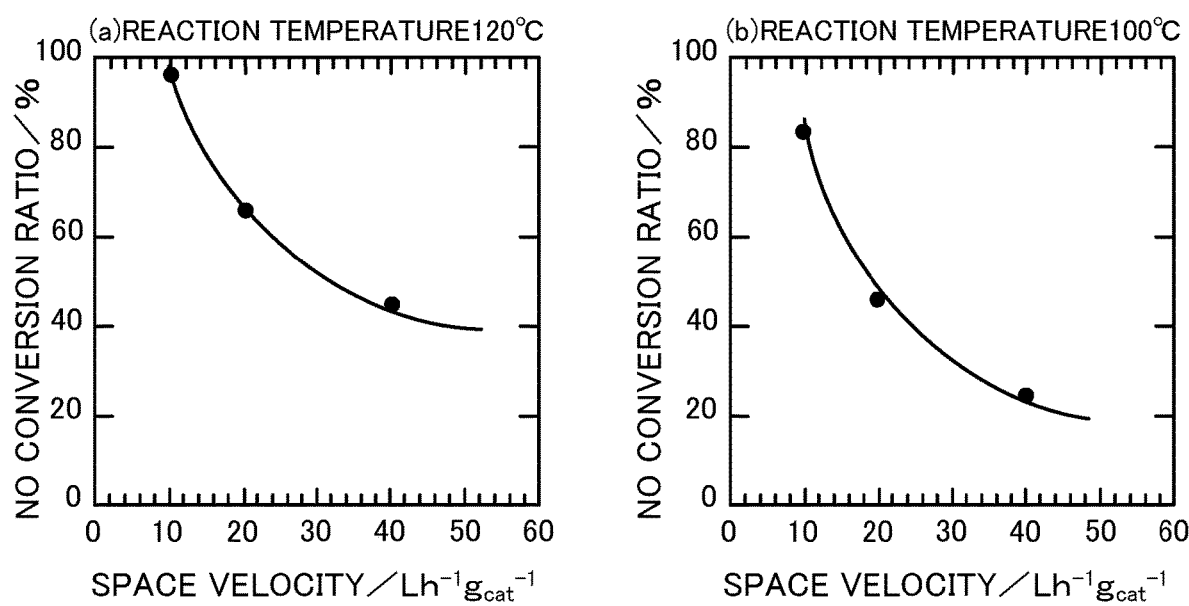
FIG. 5 illustrates the space velocity dependency in the case where a vanadium pentoxide catalyst produced in Reference Example 1 is used in a $NH_3$-SCR reaction.

In the case where the catalyst in Reference Example 1 ($V_2O_5\_300°$ C.) was used, the space velocity (for gas treatment) dependency was measured by performing the selective catalytic reduction reaction under the conditions listed in Table 3 below. FIG. 5 illustrates the measurement results. FIG. 5(a) illustrates the NO conversion ratio at a reaction temperature of 120° C. FIG. 5(b) illustrates the NO conversion ratio at a reaction temperature of 100° C. The 80% NO detoxification was about 15 $Lh^{-1}g_{cat}^{-1}$ at 120° C. and about 11 $Lh^{-1}g_{cat}^{-1}$ at 100° C. In an experiment in which the space velocity was changed, the $N_2$ selectivity was almost 100%.

TABLE 3

$NH_3$-SCR measurement conditions

| | |
|---|---|
| Reaction temperature | 120 or 100° C. |
| Amount of catalyst | 0.375 g, 0.750 g, 1.5 g |
| Total gas flow rate | 250 mLmin$^{-1}$ (NO: 250 ppm, NH$_3$: 250 ppm, O$_2$: 4 vol %, Ar balance) |
| Space velocity | 10-40 $Lh^{-1}g_{cat}^{-1}$ |
| Gas flow time | 0.5 h |

(Reaction in Coexistence with Water)

Figure 6:
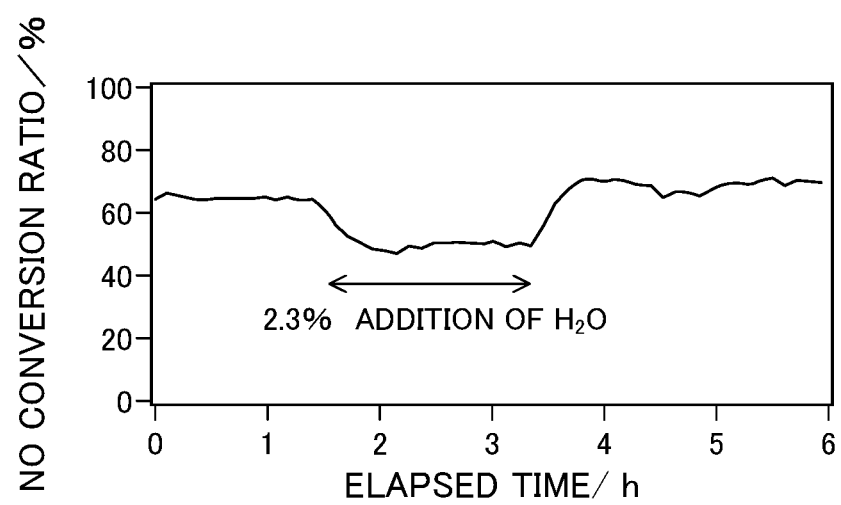
FIG. 6 illustrates a change in the NO conversion ratio over time in the case where a vanadium pentoxide catalyst produced in Reference Example 1 is used in a selective catalytic reduction reaction in coexistence with water.

An experiment of the $NH_3$-SCR reaction was performed using the catalyst in Reference Example 1 ($V_2O_5\_300°$ C.) under the conditions listed in Table 4 below at a reaction temperature of 150° C. at a space velocity of 20 $Lh^{-1}g_{cat}^{-1}$. FIG. 6 illustrates a change in the NO conversion ratio over time in the experiment. As a result of addition of 2.3% $H_2O$ 1.5 hours after the start of the reaction, the NO conversion ratio decreased from 64% to 50%. The addition of $H_2O$ did not change the $N_2$ selectivity. The $N_2$ selectivity was 100%. As a result of stop of the addition of water 3.5 hours after the start of the reaction, the NO conversion ratio increased to 67%.

TABLE 4

$NH_3$-SCR measurement conditions

| | |
|---|---|
| Reaction temperature | 150° C. |
| Amount of catalyst | 0.375 g |
| Total gas flow rate | 250 mLmin$^{-1}$ (NO: 250 ppm, NH$_3$: 250 ppm, O$_2$: 4 vol %, Ar balance) |
| Space velocity | 20 $Lh^{-1}g_{cat}^{-1}$ |

(Reaction in Coexistence with S)

Figure 7:
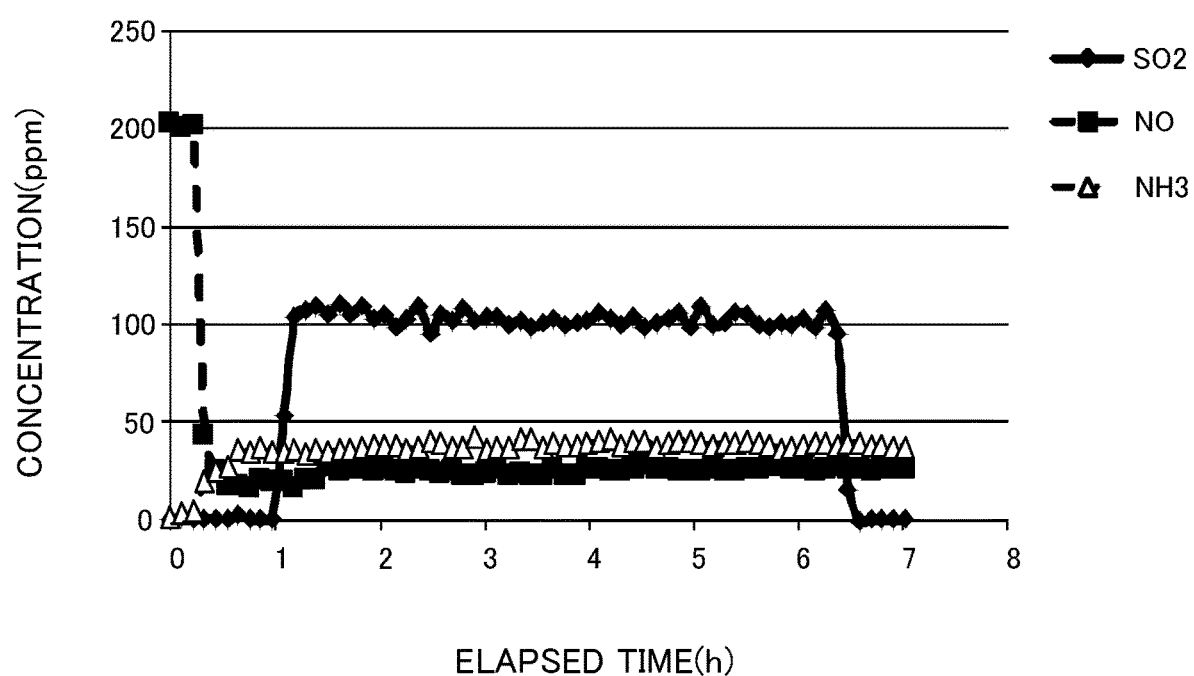
FIG. 7 illustrates changes in the $NH_3$, NO, and $SO_2$ concentrations over time in the case where a vanadium pentoxide catalyst produced in Reference Example 1 is used in a selective catalytic reduction reaction in coexistence with S.

Under the same conditions as those of the experiment of the reaction in coexistence with water, 100 ppm $SO_2$ was caused to flow through a reaction gas. FIG. 7 illustrates the experimental results. No change occurred to the catalytic activity of NO. After the completion of the temperature increase to 150° C., the $SO_2$ concentration did not decrease though $H_2O$ and $O_2$ were constantly present. Consequently, $SO_2$ did not react. Accordingly, the denitration catalysts in Examples were found to have S resistance.

(Relationship Between Amount of Vanadium Pentoxide Supported and NO Conversion Ratio)

Figure 8:
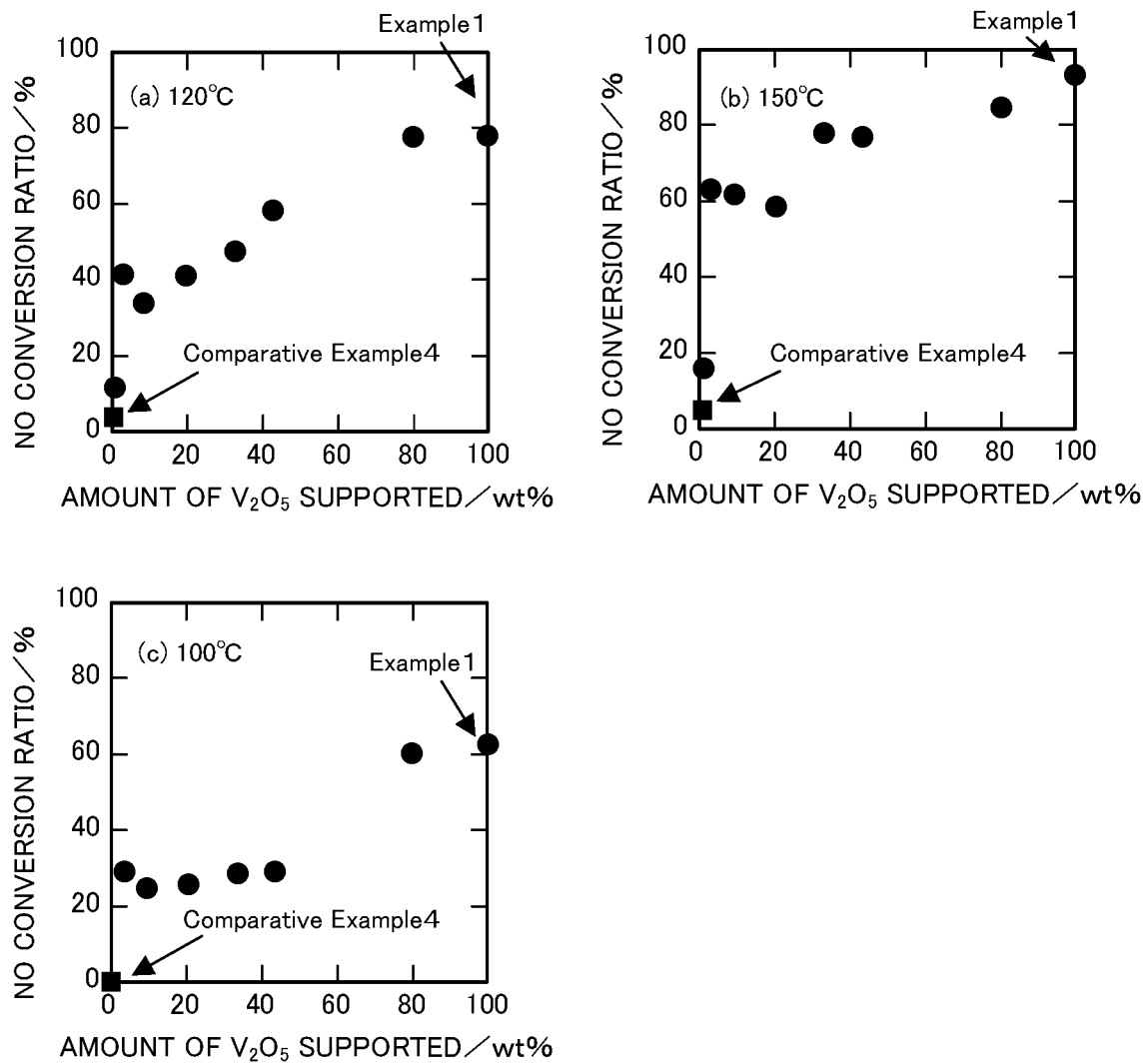
FIG. 8 illustrates the relationship between the amount of vanadium pentoxide supported and the NO conversion ratio of a vanadium pentoxide catalyst produced in each of Examples at each reaction temperature.

FIG. 8 illustrates the relationship between the amount of vanadium pentoxide supported and the NO conversion ratio at each reaction temperature. FIG. 8(a) illustrates the relationship between the amount of vanadium pentoxide supported and the NO conversion ratio at a reaction temperature of 120° C. Similarly, FIG. 8(b) illustrates the relationship between the amount of vanadium pentoxide supported and the NO conversion ratio at a reaction temperature of 150° C., and FIG. 8(c) illustrates the relationship at a reaction temperature of 100° C. In each of the graphs, the catalyst in which the amount of vanadium pentoxide supported is 100 wt % is the denitration catalyst $V_2O_5\_SG\_300$ produced in Example 1. The points plotted using a square indicate a NO conversion ratio of the existing catalyst in Comparative Example 4. All the graphs showed that, on the whole, the NO conversion ratio increased as the amount of vanadium pentoxide supported was increased. Herein, all the graphs showed that the catalyst in which the amount of vanadium pentoxide supported was 3.3 wt % had a higher NO conversion ratio than the catalyst in which the amount of vanadium pentoxide supported was 9.0 wt %. Specifically, as illustrated in FIG. 8(a), in the $NH_3$-SCR reaction at a reaction temperature of 120° C., the NO conversion ratio reached 80% when the amount of vanadium pentoxide supported was increased to 80 wt %. As illustrated in FIG. 8(b), in the $NH_3$-SCR reaction at a reaction temperature of 150° C., the NO conversion ratio considerably increased when the amount of vanadium pentoxide supported was increased to 3.3 wt %. As illustrated in FIG. 8(c), in the selective catalytic reduction reaction at a reaction temperature of 100° C., the denitration catalyst in which the amount of vanadium pentoxide supported was 80 wt % had a considerably increased NO conversion ratio compared with the denitration catalysts in which the amounts of vanadium pentoxide supported were 43 wt % or less.

(Relationship Between BET Specific Surface Area and NO Conversion Ratio)

Figure 9:
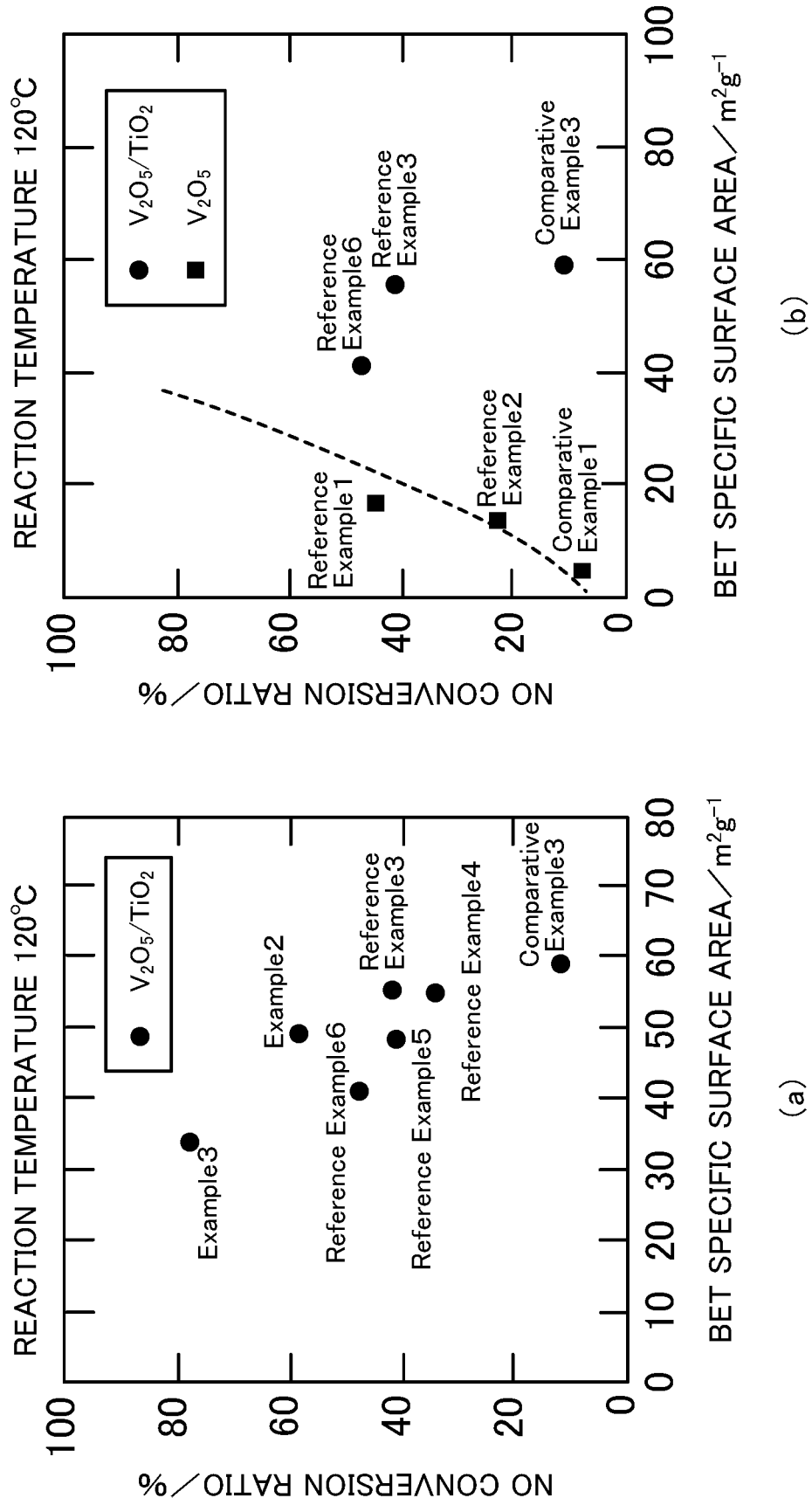
FIG. 9 illustrates the relationship between the BET specific surface area and the NO conversion ratio of a vanadium pentoxide catalyst produced in each of Examples, Reference Examples, and Comparative Examples.

FIG. 9(a) illustrates the relationship between the BET specific surface area and the NO conversion ratio of the denitration catalysts in which vanadium pentoxide was supported on titanium oxide. In the denitration catalyst in which vanadium pentoxide was supported on titanium oxide, as the amount of vanadium pentoxide supported was increased, the BET specific surface area decreased, but the activity increased on the whole. FIG. 9(b) illustrates the relationship between the BET specific surface area and the NO conversion ratio of both the denitration catalysts in which vanadium pentoxide was supported on titanium oxide and the denitration catalysts in which vanadium pentoxide was not supported on titanium oxide. In the catalysts in which vanadium pentoxide was not supported on titanium oxide, the activity increased with increasing the BET specific surface area.

2. $V_2O_5$ Catalyst Produced Through Sol-Gel Process 2.1 Examples (Examples 4 to 6 and Reference Examples 7 and 8)

In "Example 1" of the above-described "1.1 Examples and Comparative Examples", ammonium vanadate was dissolved in an oxalic acid solution such that the molar ratio of vanadium and oxalic acid was 1:3, then water was evaporated, drying was performed, and the resulting dried powder was fired. Thus, a denitration catalyst was produced. In the denitration catalysts of Reference Example 7, Examples 4 to 6, and Reference Example 8, the molar ratios of vanadium and oxalic acid were set to 1:1, 1:2, 1:3, 1:4, and 1:5, respectively. Specifically, as described above, ammonium vanadate was dissolved in an oxalic acid solution (molar ratio of vanadium:oxalic acid=1:1 to 1:5). After ammonium vanadate was completely dissolved, water in the solution was evaporated on a hot stirrer, and drying was performed in a dryer at 120° C. for one night. Then, the dried powder was fired in the air at 300° C. for 4 hours. The sample names were given as "V$_2$O$_5$_SG_1:1" (Reference Example 7), "V$_2$O$_5$_SG_1:2" (Example 4), "V$_2$O$_5$_SG_1:3" (Example 5), "V$_2$O$_5$_SG_1:4" (Example 6), and "V$_2$O$_5$_SG_1:5" (Reference Example 8). Herein, the "V$_2$O$_5$_SG_300" in "Example 1" of "1.1 Examples and Comparative Examples" and "V$_2$O$_5$_SG_1:3" in Example 5 were substantially the same, but the sample name "V$_2$O$_5$_SG_1:3" in "Example 5" was used for the sake of convenience of description. To increase the BET specific surface area, a surfactant may be added to the oxalic acid solution. Examples of the surfactant include anionic surfactants such as hexadecyltrimethylammonium bromide (CTAB), sodium lauryl sulfate (SDS), and hexadecylamine; cationic surfactants; amphoteric surfactants; and nonionic surfactants.

Figure 10:
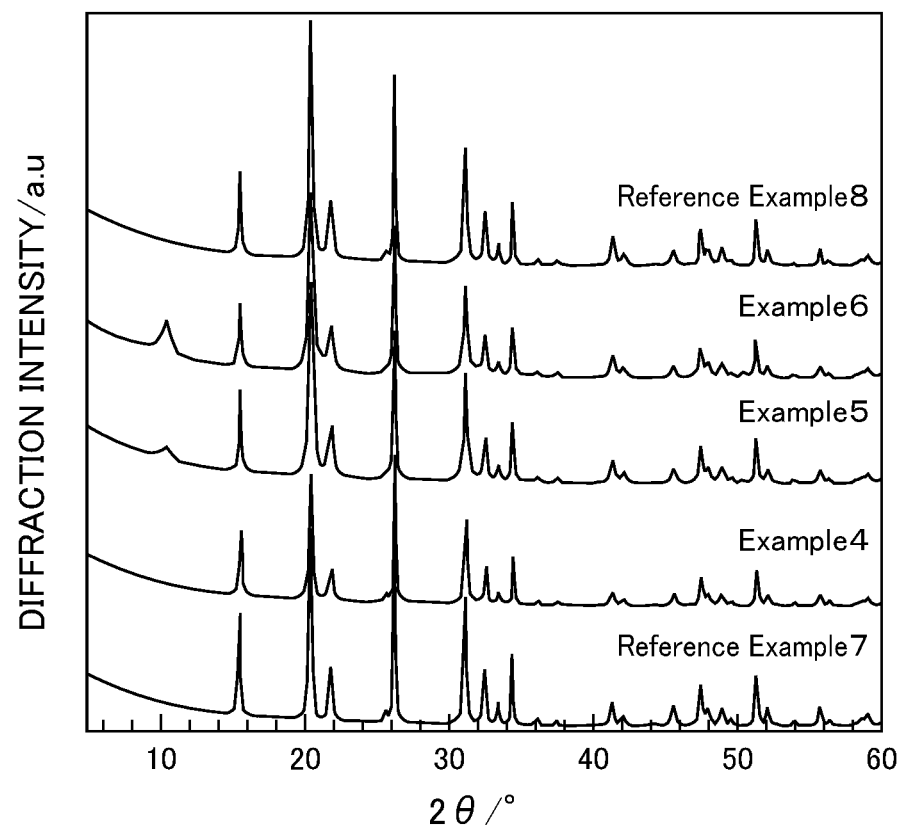
FIG. 10 illustrates the powder X-ray diffraction results of vanadium pentoxide catalysts produced in Examples 4 to 6 and Reference Examples 7 and 8.

2.2 Evaluation 2.2.1 Powder X-Ray Diffraction
(Diffraction Method)
In the same manner as in 1.2.1, powder X-ray diffraction analysis was performed with a Rigaku smart lab using Cu-Ka.
(Diffraction result)
FIG. 10 illustrates powder XRD patterns of Reference Example 7, Examples 4 to 6, and Reference Example 8 (V$_2$O$_5$_SG). In the vanadium pentoxides (Reference Examples 7, 7, and 10) produced using the solutions having vanadium:oxalic acid ratios of 1:1, 1:2, and 1:5, only peaks for orthorhombic V$_2$O$_3$ were detected. In the vanadium pentoxides (Examples 5 and 6) produced using the solutions having vanadium:oxalic acid ratios of 1:3 and 1:4, an unidentified peak was detected at 11° in addition to the peaks for orthorhombic V$_2$O$_3$. However, the peak has not been identified yet.

2.2.2 Measurement of BET Specific Surface Area
(Measurement Method)
In the same manner as in 1.2.3, the BET specific surface area was measured with a MicrotracBEL BELSORP-max. Pretreatment was performed in an Ar atmosphere at 200° C. for 2 hours, and then measurement was performed at 196° C.
(Measurement Result)

TABLE 5

BET specific surface area of vanadium pentoxide catalyst

| Catalyst | | BET specific surface area before reaction/ m$^2$g$^{-1}$ | BET specific surface area after reaction/ m$^2$g$^{-1}$ |
|---|---|---|---|
| Reference Example 7 | (V$_2$O$_5$_SG_1:1) | 29.9 | n.d. |
| Example 4 | (V$_2$O$_5$_SG_1:2) | 33.5 | n.d. |
| Example 5 | (V$_2$O$_5$_SG_1:3) | 62.9 | 43.4 |
| Example 6 | (V$_2$O$_5$_SG_1:4) | 57.0 | n.d. |
| Reference Example 8 | (V$_2$O$_5$_SG_1:5) | n.d. | n.d. |

Table 5 shows BET specific surface areas of Reference Example 7 (V$_2$O$_5$_SG_1:1), Example 4 (V$_2$O$_5$_SG_1:2), Example 5 (V$_2$O$_5$_SG_1:3), Example 6 (V$_2$O$_5$_SG_1:4), and Reference Example 8 (V$_2$O$_5$_SG_1:5). As the ratio of the oxalic acid was increased, the specific surface area increased at vanadium:oxalic acid ratios of 1:1 to 1:3. When the ratio of the oxalic acid was further increased, the specific surface area decreased. The specific surface area in Example 5 (V$_2$O$_5$_SG_1:3) after the catalytic activity test described below considerably decreased to 43.4 m$^2$g$^{-1}$ compared with the specific surface area before the catalytic activity test.

Figure 11:
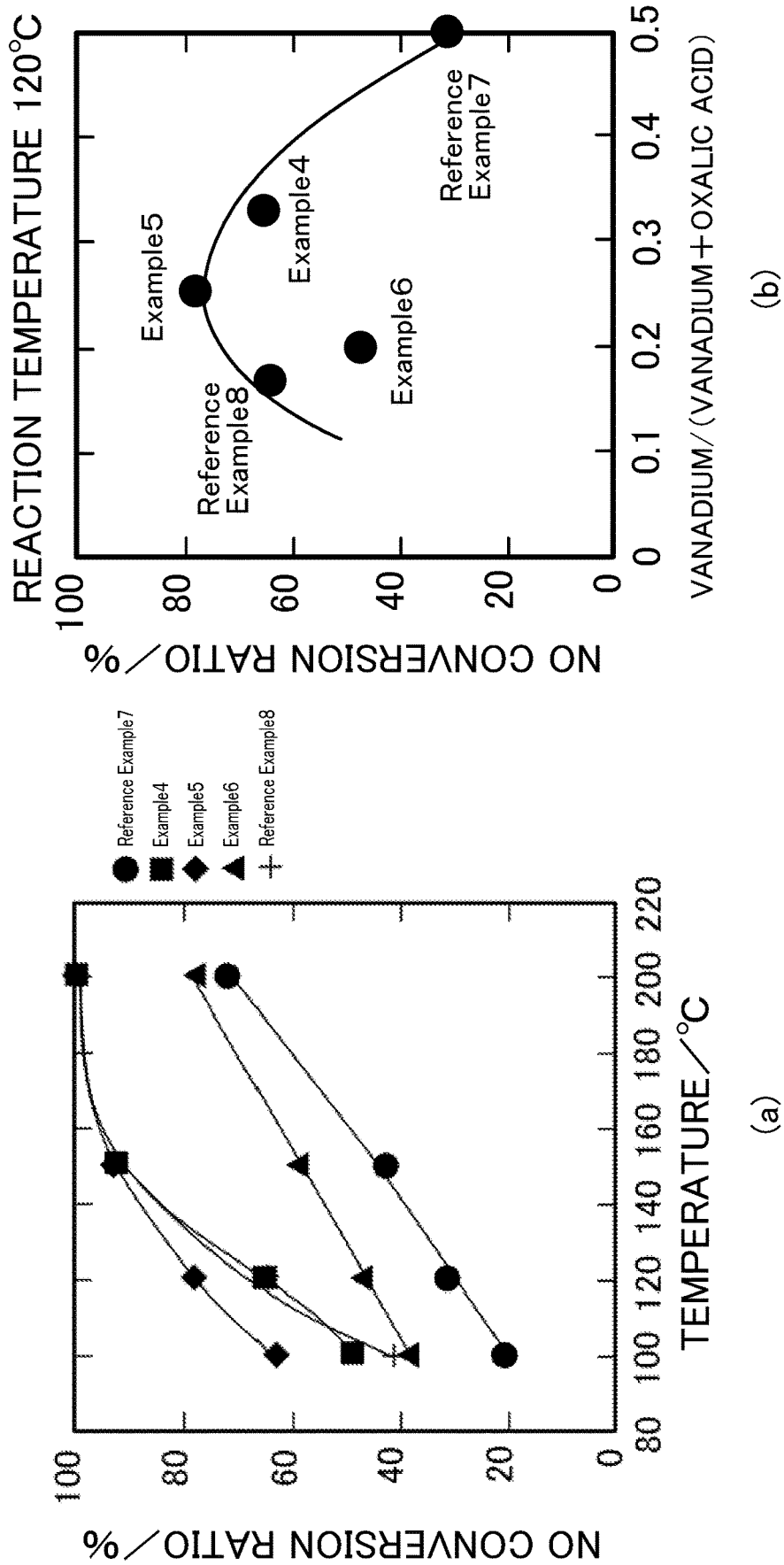
FIG. 11 illustrates the $NH_3$-SCR activity of vanadium pentoxide catalysts produced in Examples 4 to 6 and Reference Examples 7 and 8.
Figure 12:
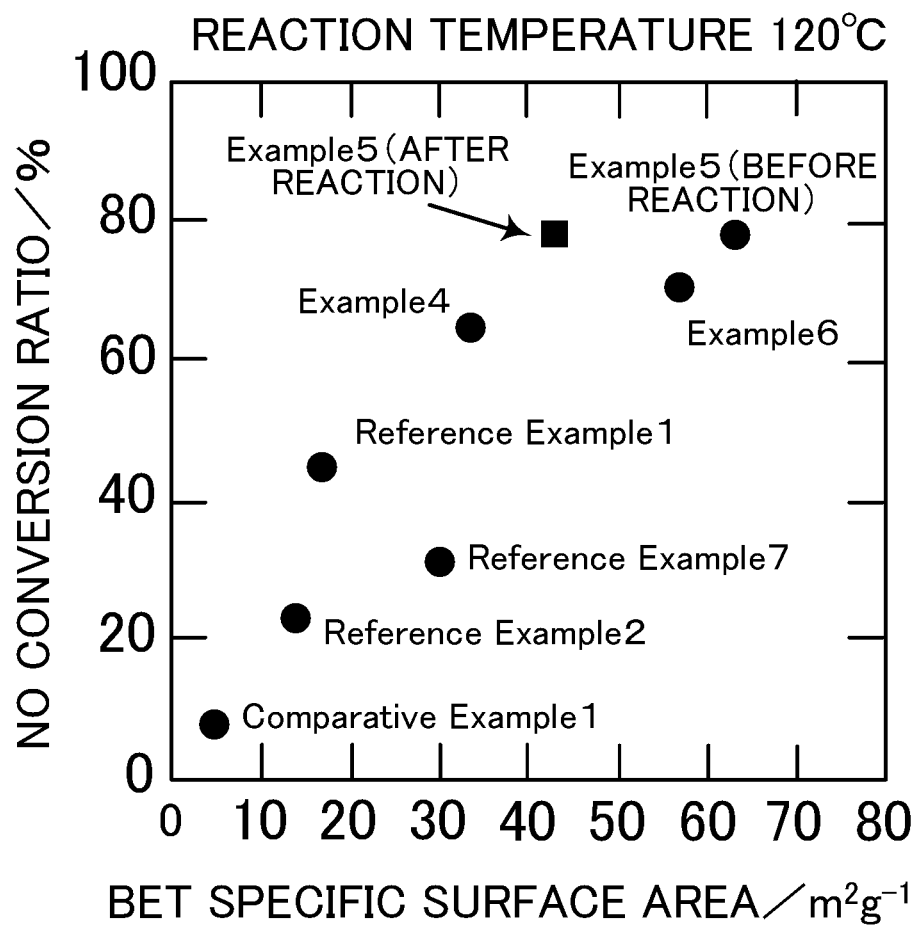
FIG. 12 illustrates the relationship between the specific surface area and the NO conversion ratio of vanadium pentoxide catalysts produced in Examples 4 to 6, Reference Examples 1, 2, and 7, and Comparative Example 1.

2.2.3 Measurement of Catalytic Activity
(Measurement Method)
By the same measurement method as in 1.2.4, the NH$_3$-SCR activity of each V$_2$O$_5$_SG catalyst was measured and the NO conversion ratio was calculated.
(Measurement result)
FIG. 11 illustrates the NH$_3$-SCR activity of each V$_2$O$_5$_SG catalyst. FIG. 11(a) illustrates the NO conversion ratio plotted against reaction temperature in the NH$_3$-SCR reaction that uses each catalyst. FIG. 11(b) illustrates the relationship between the vanadium:oxalic acid ratio and the NO conversion ratio at a reaction temperature of 120° C. In the catalyst of Example 5 (V$_2$O$_5$_SG_1:3) having a vanadium:oxalic acid ratio of 1:3, the highest NO conversion ratio was achieved. When the oxalic acid was further added, the NO conversion ratio decreased. The NO conversion ratio in Example 6 (V$_2$O$_5$_SG_1:4) was lower than that in Example 4 (V$_2$O$_5$_SG_1:2) despite the fact that the specific surface area in Example 6 was larger than that in Example 4.
(Relationship Between Specific Surface Area and NO Conversion Ratio)
FIG. 12 illustrates the relationship between the BET specific surface area and the NO conversion ratio in Examples 4 to 6 and Reference Example 7 (V$_2$O$_5$_SG), Reference Example 1 (V$_2$O$_5$_300), Reference Example 2 (V$_2$O$_5$_400), and Comparative Example 1 (V$_2$O$_5$_500). The point plotted using a square indicates the relationship between the BET specific surface area and the NO conversion ratio after the selective catalytic reduction reaction in Example 5 (V$_2$O$_5$_SG_1:3). As described above, it was shown that the highest NO conversion ratio was achieved in the catalyst of Example 5 (V$_2$O$_5$_SG_1:3) having a vanadium:oxalic acid ratio of 1:3.

2.2.4 Characterization by NH$_3$-TPD
(Measurement Method)
The amount of acid sites on the surface of the catalyst can be estimated by NH$_3$-TPD (TPD: temperature programed desorption). In a BELCAT manufactured by MicrotracBEL Corp., 0.1 g of each of the catalysts in Reference Example 1 (V$_2$O$_5$_300), Reference Example 2 (V$_2$O$_5$_400), Comparative Example 1 (V$_2$O$_5$_500), Example 4 (V$_2$O$_5$_SG_1:2), and Example 5 (V$_2$O$_5$_SG_1:3) was pretreated at 300° C. for 1 hour while He (50 ml/min) was caused to flow. Then, the temperature was decreased to 100° C., and 5% ammonia/He (50 ml/min) was caused to flow for 30 minutes to adsorb ammonia. The flow gas was changed to He (50 ml/min) and this state was kept for 30 minutes for stabilization. Then, the temperature was increased at 10° C./min and ammonia, which has a mass number of 16, was monitored with a mass spectrometer.
(Measurement Result)

TABLE 6

Measured amount of NH$_3$ desorbed by NH$_3$-TPD

| Catalyst | | Amount of NH$_3$ desorbed/μmolg$^{-1}$ |
|---|---|---|
| Reference Example1 | (V$_2$O$_5$_300) | 22.9 |
| Reference Example2 | (V$_2$O$_5$_400) | 14.0 |
| Comparative Example1 | (V$_2$O$_5$_500) | 5.21 |
| Example4 | (V$_2$O$_5$_SG_1:2) | 51.4 |
| Example5 | (V$_2$O$_5$_SG_1:3) | 77.5 |

Table 6 shows the measurement results of the amount of $NH_3$ desorbed when the catalysts in Reference Example 1 ($V_2O_5\_300$), Reference Example 2 ($V_2O_5\_400$), Comparative Example 1 ($V_2O_5\_500$), Example 4 ($V_2O_5\_SG\_1:2$), and Example 5 ($V_2O_5\_SG\_1:3$) were used.

Figure 13:
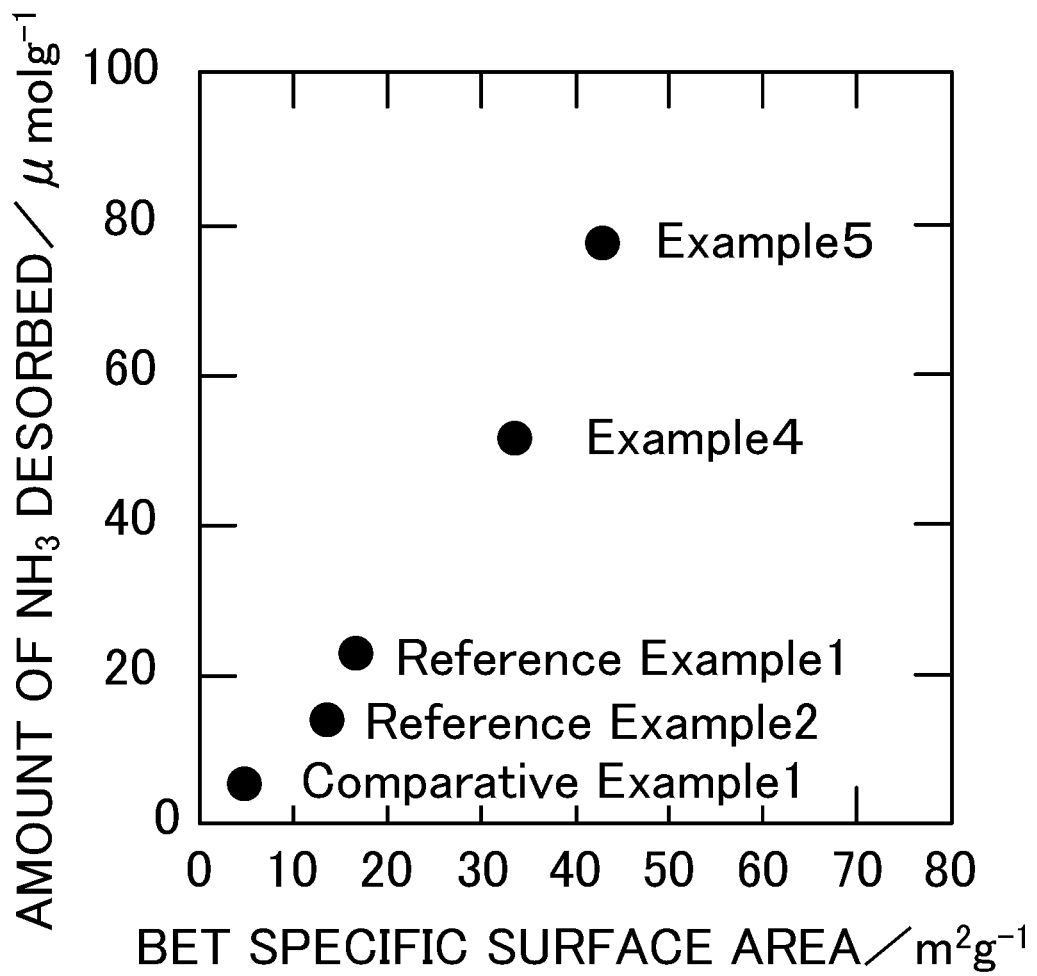
FIG. 13 illustrates the relationship between the BET specific surface area and the amount of $NH_3$ desorbed of vanadium pentoxide catalysts produced in Examples 4 and 5, Reference Examples 1 and 2, and Comparative Example 1.
Figure 14:
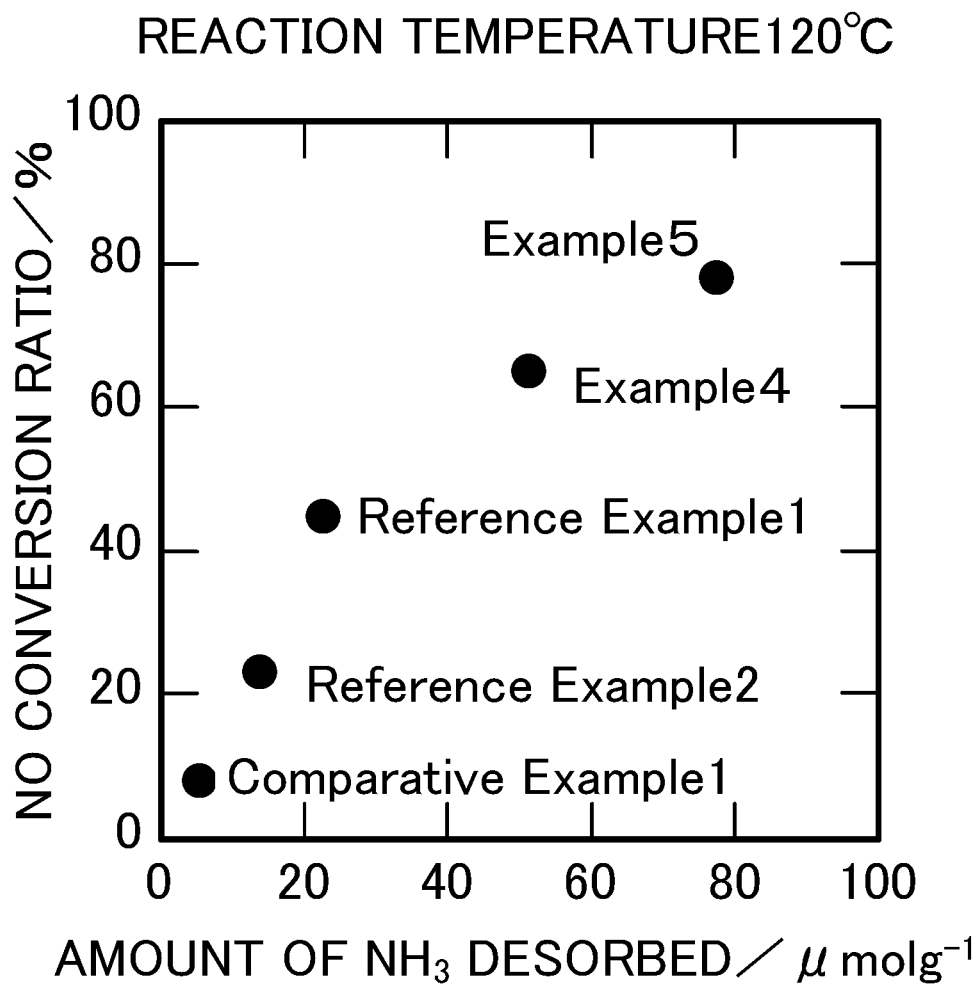
FIG. 14 illustrates the relationship between the amount of $NH_3$ desorbed and the NO conversion ratio of vanadium pentoxide catalysts produced in Examples 4 and 5, Reference Examples 1 and 2, and Comparative Example 1.

FIG. 13 is a graph obtained by plotting the amount of $NH_3$ desorbed as a function of the BET specific surface area of each catalyst. The graph in FIG. 13 showed that the amount of $NH_3$ desorbed increased substantially in proportion to the BET specific surface area of $V_2O_5$. FIG. 14 is a graph obtained by plotting the NO conversion ratio as a function of the amount of $NH_3$ desorbed in each catalyst. The graph showed that the NO conversion ratio increased as the catalyst had a larger amount of $NH_3$ desorbed, that is, a larger amount of acid sites on the surface of the catalyst.

As described above, the denitration catalyst of the present invention that contains 3.3 wt % or more of vanadium oxide in terms of vanadium pentoxide and has a specific surface area of 10 $m^2/g$ or more exhibits a high denitration efficiency at a low temperature of 200° C. or lower in the selective catalytic reduction reaction that uses ammonia as a reducing agent. On the other hand, oxidation of $SO_2$ is not found.

The invention claimed is:

1. A denitration catalyst obtained by coating a substrate with a catalyst component, wherein the catalyst component contains 80 wt % or more of vanadium pentoxide and has a BET specific surface area of 30 $m^2/g$ or more, and the denitration catalyst is used for denitration at 200° C. or lower.

2. The denitration catalyst according to claim 1, wherein in the catalyst component, an amount of NH3 desorbed by NH3-TPD (TPD: temperature programed desorption) is 10.0 µmol/g or more.

3. A method for producing the denitration catalyst according to claim 1, the method comprising a step of impregnating the substrate with a chelate compound solution in which vanadium pentoxide is dissolved and then performing firing.

4. A method for producing the denitration catalyst according to claim 1, the method comprising a step of spraying a chelate compound solution in which vanadium pentoxide is dissolved onto the substrate and then performing firing.

* * * * *